United States Patent
Hagihara

(10) Patent No.: US 12,108,176 B2
(45) Date of Patent: Oct. 1, 2024

(54) IMAGING DEVICE AND ENDOSCOPE SYSTEM

(71) Applicant: OLYMPUS CORPORATION, Tokyo (JP)

(72) Inventor: Yoshio Hagihara, Nishitama-gun (JP)

(73) Assignee: OLYMPUS CORPORATION, Tokyo (JP)

(*) Notice: Subject to any disclaimer, the term of this patent is extended or adjusted under 35 U.S.C. 154(b) by 102 days.

(21) Appl. No.: 17/942,360

(22) Filed: Sep. 12, 2022

(65) Prior Publication Data

US 2023/0007196 A1 Jan. 5, 2023

Related U.S. Application Data

(63) Continuation of application No. PCT/JP2020/015513, filed on Apr. 6, 2020.

(51) Int. Cl.
*H04N 25/709* (2023.01)
*H04N 25/771* (2023.01)

(52) U.S. Cl.
CPC ......... *H04N 25/709* (2023.01); *H04N 25/771* (2023.01)

(58) Field of Classification Search
CPC ............................ H04N 25/709; H04N 25/771
See application file for complete search history.

(56) References Cited

U.S. PATENT DOCUMENTS

| 11,218,659 | B2* | 1/2022 | Xu | H04N 25/76 |
| 2007/0146517 | A1* | 6/2007 | Yu | H04N 25/00 |
| | | | | 348/E3.018 |
| 2010/0214460 | A1* | 8/2010 | Hasegawa | H04N 25/745 |
| | | | | 348/300 |
| 2010/0295981 | A1* | 11/2010 | Morimoto | H04N 25/626 |
| | | | | 348/308 |

(Continued)

FOREIGN PATENT DOCUMENTS

| JP | H02272742 A | 11/1990 |
| JP | 2006129127 A | 5/2006 |
| JP | 2006191623 A | 7/2006 |

(Continued)

OTHER PUBLICATIONS

International Search Report dated Jul. 7, 2020 issued in PCT/JP2020/015513.

*Primary Examiner* — Rowina J Cattungal
(74) *Attorney, Agent, or Firm* — Scully, Scott, Murphy & Presser, P.C.

(57) ABSTRACT

An imaging device includes a voltage generation circuit and an output circuit. The voltage generation circuit includes a first capacitance element including a fifth terminal. The voltage generation circuit is configured to provide the fifth terminal with a first voltage in accordance with a power source voltage so as to store an electric charge in the first capacitance element. The voltage generation circuit is configured to increase a voltage of the fifth terminal by a second voltage in accordance with the power source voltage so as to generate a control voltage having a greater absolute value (Continued)

than an absolute value of the power source voltage. The output circuit is configured to output the control voltage to at least one of a gate terminal of a reset transistor of a pixel and a gate terminal of a transfer transistor of the pixel.

9 Claims, 9 Drawing Sheets

(56) References Cited

U.S. PATENT DOCUMENTS

| | | | |
|---|---|---|---|
| 2015/0077609 A1* | 3/2015 | Okamoto | H04N 25/70 348/303 |
| 2022/0157876 A1* | 5/2022 | Matsumoto | H01L 23/532 |

FOREIGN PATENT DOCUMENTS

| | | | |
|---|---|---|---|
| JP | 2010171869 A | 8/2010 | |
| JP | 2010273146 A | 12/2010 | |

\* cited by examiner

IMAGING DEVICE AND ENDOSCOPE SYSTEM

The present application is a continuation application based on International Patent Application No. PCT/JP2020/ 015513 filed on Apr. 6, 2020, the content of which is incorporated herein by reference.

BACKGROUND OF THE INVENTION

Field of the Invention

The present invention relates to an imaging device and an endoscope system.

Description of Related Art

Physical-quantity detection semiconductor devices having sensors sensitive to externally input electromagnetic waves (light, radiation, etc.) are used in various fields. A physical quantity is converted into an electrical signal by a sensor. For example, a sensor in an imaging device is a pixel. In general, electrical signals of a reference level and a signal level are read from the sensor. For example, the reference level in the imaging device is a reset level.

In an endoscope system using an imaging device, a CCD-type imaging device has been generally used. Since the CCD-type imaging device requires multiple power source voltages, there is a limit to miniaturization of the CCD-type imaging device. In order to solve this, CMOS-type imaging devices driven by a single power source voltage (for example, 3.3 [V]) have been used in recent years.

For example, an imaging device including a booster circuit using a charge pump is disclosed in Japanese Unexamined Patent Application, First Publication No. 2006-129127. The booster circuit includes a plurality of capacitance elements and a plurality of diodes.

SUMMARY OF THE INVENTION

According to a first aspect of the present invention, an imaging device includes two or more pixels, a voltage generation circuit, and an output circuit. The two or more pixels are disposed in a matrix shape. Each of the pixels includes a photodiode, a floating diffusion, a reset transistor, and a transfer transistor. The photodiode is configured to generate an electric charge through photoelectric conversion. The floating diffusion is configured to store the electric charge generated by the photodiode. The reset transistor includes a first terminal, a second terminal, and a gate terminal. One of the first terminal and the second terminal is a source terminal. The other of the first terminal and the second terminal is a drain terminal. A power source voltage is input to the first terminal. The second terminal is electrically connected to the floating diffusion. The transfer transistor includes a third terminal, a fourth terminal, and a gate terminal. One of the third terminal and the fourth terminal is a source terminal. The other of the third terminal and the fourth terminal is a drain terminal. The third terminal is electrically connected to the photodiode. The fourth terminal is electrically connected to the floating diffusion. The voltage generation circuit includes a first capacitance element including a fifth terminal. The voltage generation circuit is configured to provide the fifth terminal with a first voltage in accordance with the power source voltage so as to store an electric charge in the first capacitance element. The voltage generation circuit is configured to increase a voltage of the fifth terminal by a second voltage in accordance with the power source voltage so as to generate a control voltage having a greater absolute value than an absolute value of the power source voltage. The output circuit is configured to output the control voltage to at least one of the gate terminal of the reset transistor and the gate terminal of the transfer transistor.

According to a second aspect of the present invention, in the first aspect, an array of the two or more pixels may include two or more rows. The output circuit may be configured to sequentially select the rows and electrically connect the voltage generation circuit and the pixel included in a selected row.

According to a third aspect of the present invention, in the second aspect, the output circuit may include a selection transistor electrically connected to the voltage generation circuit and the gate terminal of the reset transistor in each of the two or more pixels. The selection transistor may be configured to electrically connect the gate terminal of the reset transistor and the voltage generation circuit to each other in a reset period in which a reset instruction signal is provided to the selection transistor. The voltage generation circuit may be configured to generate the control voltage in the reset period.

According to a fourth aspect of the present invention, in the second aspect, the output circuit may include a selection transistor electrically connected to the voltage generation circuit and the gate terminal of the transfer transistor in each of the two or more pixels. The selection transistor may be configured to electrically connect the gate terminal of the transfer transistor and the voltage generation circuit to each other in a transfer period in which a transfer instruction signal is provided to the selection transistor. The voltage generation circuit may be configured to generate the control voltage in the transfer period.

According to a fifth aspect of the present invention, in the first aspect, the voltage generation circuit may include the first capacitance element, a second capacitance element, and a switch. The first capacitance element may include the fifth terminal and a sixth terminal. A direct-current voltage may be input to the sixth terminal. The second capacitance element may include a seventh terminal and an eighth terminal. The seventh terminal may be electrically connected to the fifth terminal. The switch may include a ninth terminal and a tenth terminal. The ninth terminal may be electrically connected to the fifth terminal. The first voltage may be input to the tenth terminal. The state of the switch may be either an ON state in which the ninth terminal and the tenth terminal are electrically connected to each other or an OFF state in which the ninth terminal and the tenth terminal are electrically insulated from each other. The first voltage may be input to the fifth terminal when the state of the switch is the ON state. The first voltage of the fifth terminal may increase by the second voltage when a third voltage is input to the eighth terminal in accordance with the power source voltage after the state of the switch changes from the ON state to the OFF state.

According to a sixth aspect of the present invention, in the first aspect, the voltage generation circuit may be configured to generate the control voltage after generating the first voltage. The output circuit may be configured to output the control voltage to the gate terminal of the reset transistor after outputting the first voltage to the gate terminal of the reset transistor.

According to a seventh aspect of the present invention, in the sixth aspect, the first voltage may be the power source voltage.

According to an eighth aspect of the present invention, in the first aspect, the voltage generation circuit may be configured to generate the control voltage after generating the first voltage. The output circuit may be configured to output the control voltage to the gate terminal of the transfer transistor after outputting the first voltage to the gate terminal of the transfer transistor.

According to a ninth aspect of the present invention, in the eighth aspect, the first voltage is the power source voltage.

According to a tenth aspect of the present invention, an endoscope system includes the imaging device.

DETAILED DESCRIPTION OF THE INVENTION

Hereinafter, embodiments of the present invention will be described with reference to the drawings. In a case in which a first circuit element is electrically connected to a second circuit element in the following descriptions, the first circuit element is directly connected to the second circuit element. Alternatively, a third circuit element different from the second circuit element is disposed between the first circuit element and the second circuit element, the first circuit element is connected to the third circuit element, and the third circuit element is connected to the second circuit element.

First Embodiment

Figure 1:
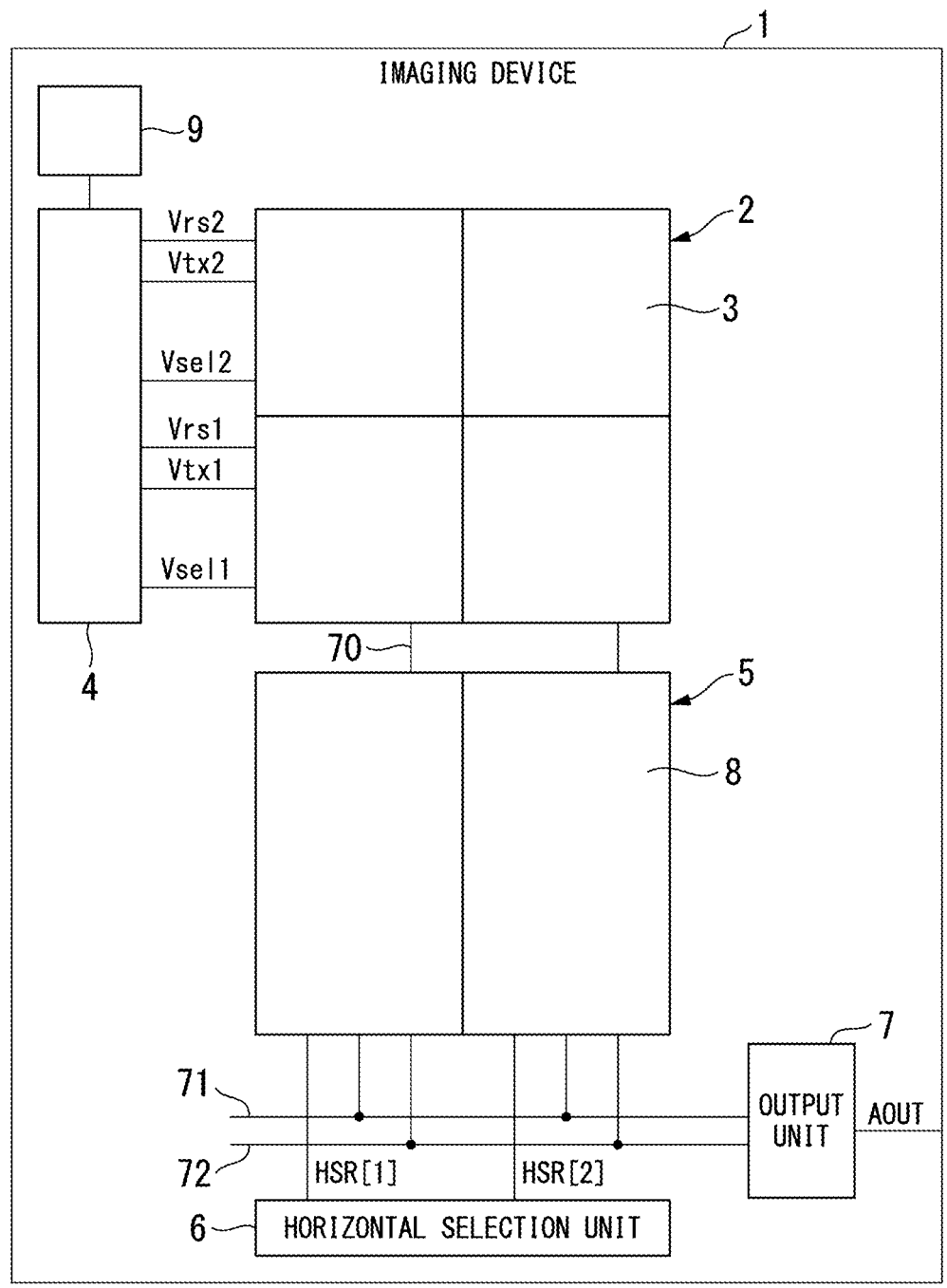
FIG. 1 is a block diagram showing a configuration of an imaging device according to a first embodiment of the present invention.

FIG. 1 shows a configuration of an imaging device 1 according to a first embodiment of the present invention. The imaging device 1 shown in FIG. 1 includes an imaging unit 2, a vertical selection unit 4, a column circuit unit 5, a horizontal selection unit 6, an output unit 7, and a voltage generation circuit 9. For example, the imaging unit 2, the vertical selection unit 4, the column circuit unit 5, the horizontal selection unit 6, the output unit 7, and the voltage generation circuit 9 are disposed in the same substrate. When a chip in which the imaging device 1 is disposed includes a plurality of substrates, the imaging unit 2, the vertical selection unit 4, the column circuit unit 5, the horizontal selection unit 6, the output unit 7, and the voltage generation circuit 9 may be distributed in the plurality of substrates.

The imaging unit 2 includes two or more pixels 3 disposed in a matrix shape. The two or more pixels 3 constitute an array having m rows and n columns. The number m and the number n are integers of two or more. The number of rows and the number of columns are not necessarily the same. In FIG. 1, an example in which the number of rows is two and the number of columns is three is shown. This is only an example and the present invention is not limited to this. The pixel 3 outputs a first pixel signal having a reset level and a second pixel signal having a signal level.

The vertical selection unit 4 selects the pixels 3 disposed in the row direction in the array of the two or more pixels 3. The vertical selection unit 4 controls an operation of the selected pixels 3. The vertical selection unit 4 outputs control signals used for controlling the two or more pixels 3 for each row in the array of the two or more pixels 3. The control signals output from the vertical selection unit 4 include a reset control signal Vrsi, a transfer control signal Vtxi, and a selection control signal Vseli. The number i is one or two. In FIG. 1, the reset control signal Vrs1, the transfer control signal Vtx1, and the selection control signal Vsel1 are output to the pixels 3 of the first row. In FIG. 1, the reset control signal Vrs2, the transfer control signal Vtx2, and the selection control signal Vsel2 are output to the pixels 3 of the second row.

The column circuit unit 5 includes two or more column circuits 8. The column circuit 8 is disposed for each column in the array of the two or more pixels 3. The column circuit 8 is connected to a vertical signal line 70 extending in the vertical direction, that is, the column direction. The vertical signal line 70 is disposed for each column in the array of the two or more pixels 3. The vertical signal line 70 is connected to the pixels 3 of each column. The column circuit 8 is electrically connected to the pixels 3 via the vertical signal line 70. The column circuit 8 generates a first pixel signal of the reset level output from the pixel 3 and generates a second pixel signal of the signal level output from the pixel 3.

The column circuit 8 is connected to a first horizontal signal line 71 and a second horizontal signal line 72 extending in the horizontal direction, that is, the row direction. A selection pulse HSR[k] is output from the horizontal selection unit 6 to the column circuit 8 corresponding to a k-th column. The number k is one or two. The column circuit 8 selected on the basis of the selection pulse HSR[k] outputs the first pixel signal to the first horizontal signal line 71 and outputs the second pixel signal to the second horizontal signal line 72.

One column circuit 8 may be disposed for two or more columns in the array of the two or more pixels 3 and may be used in the two or more columns in a time-division manner. Accordingly, the column circuit 8 has only to be disposed so as to correspond to one or more columns in the array of the two or more pixels 3.

The first horizontal signal line 71 and the second horizontal signal line 72 are connected to the output unit 7. The horizontal selection unit 6 sequentially selects the column circuits 8 by sequentially outputting the selection pulse HSR[1] and the selection pulse HSR[2] to the column circuits 8. The first pixel signal and the second pixel signal output from the column circuit 8 selected by the horizontal selection unit 6 are transferred to the output unit 7.

The output unit 7 generates an output signal AOUT on the basis of the first pixel signal and the second pixel signal. For example, the output signal AOUT is the difference between the first pixel signal and the second pixel signal. The output unit 7 outputs the output signal AOUT to a subsequent-stage circuit.

The voltage generation circuit 9 generates a control voltage having a greater absolute value than that of the power source voltage. The voltage generation circuit 9 outputs the generated control voltage to the vertical selection unit 4.

The vertical selection unit 4 outputs the control voltage to the selected pixels 3. Specifically, the vertical selection unit 4 outputs the control voltage as the reset control signal Vrsi to the pixels 3.

Figure 2:
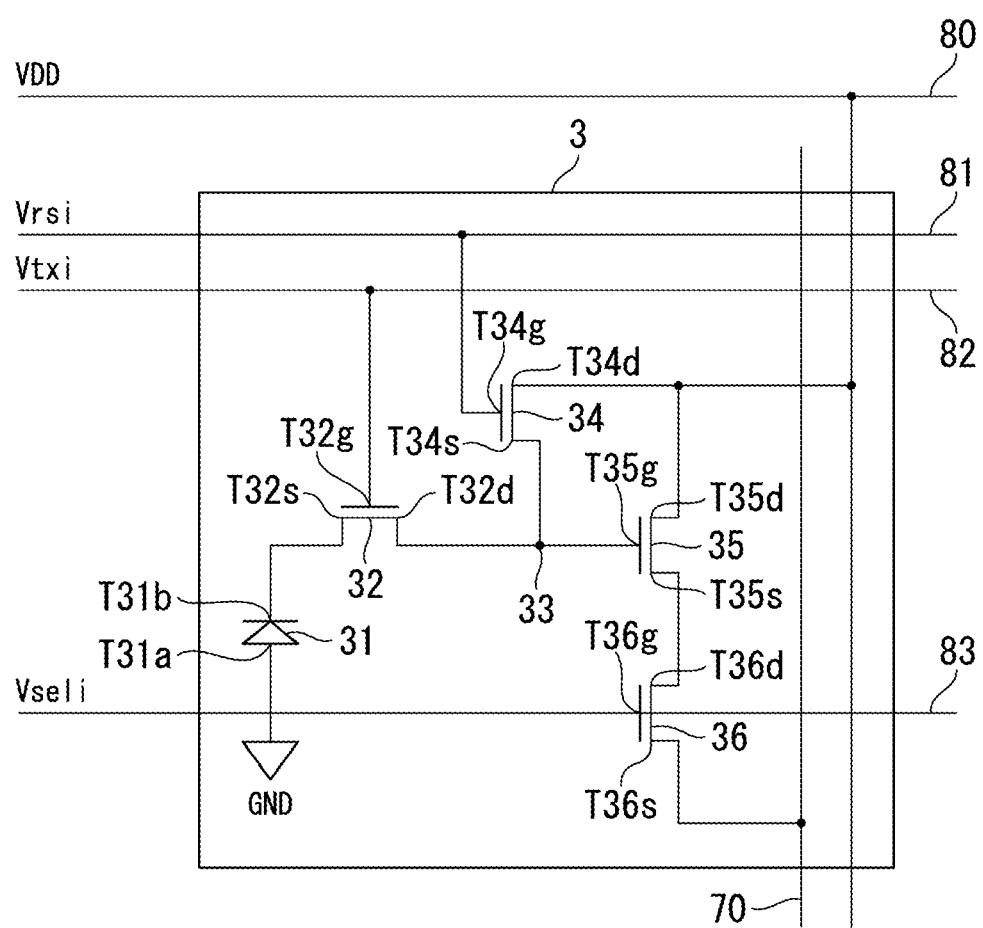
FIG. 2 is a circuit diagram showing a configuration of a pixel in the imaging device according to the first embodiment of the present invention.

FIG. 2 shows a configuration of the pixel 3. The pixel 3 shown in FIG. 2 includes a photoelectric conversion unit 31, a transfer transistor 32, a charge storage portion 33, a reset transistor 34, an amplification transistor 35, and a selection transistor 36. Each transistor shown in FIG. 2 is an NMOS transistor. Each transistor shown in FIG. 2 includes a source terminal, a drain terminal, and a gate terminal.

The photoelectric conversion unit 31 is a photodiode. The photoelectric conversion unit 31 includes a terminal T31a and a terminal T31b. The terminal T31a of the photoelectric conversion unit 31 is connected to the ground. A ground voltage GND is input to the terminal T31a of the photoelectric conversion unit 31. The terminal T31b of the photoelectric conversion unit 31 is connected to the transfer transistor 32.

A source terminal T32s of the transfer transistor 32 is connected to the terminal T31b of the photoelectric conversion unit 31. A drain terminal T32d of the transfer transistor 32 is connected to the charge storage portion 33. A gate terminal T32g of the transfer transistor 32 is connected to a control signal line 82. The control signal line 82 extends in the row direction in the array of the two or more pixels 3 and is connected to the vertical selection unit 4. The control signal line 82 transfers the transfer control signal Vtxi output from the vertical selection unit 4.

A drain terminal T34d of the reset transistor 34 is connected to a power source line 80. The power source line 80 is connected to a power source that outputs a power source voltage VDD. A source terminal T34s of the reset transistor 34 is connected to the charge storage portion 33. A gate terminal T34g of the reset transistor 34 is connected to a control signal line 81. The control signal line 81 extends in the row direction in the array of the two or more pixels 3 and is connected to the vertical selection unit 4. The control signal line 81 transfers the reset control signal Vrsi.

A drain terminal T35d of the amplification transistor 35 is connected to the power source line 80. A source terminal T35s of the amplification transistor 35 is connected to the selection transistor 36. A gate terminal T35g of the amplification transistor 35 is connected to the charge storage portion 33.

A drain terminal T36d of the selection transistor 36 is connected to the source terminal T35s of the amplification transistor 35. A source terminal T36s of the selection transistor 36 is connected to the vertical signal line 70. A gate terminal T36g of the selection transistor 36 is connected to a control signal line 83. The control signal line 83 extends in the row direction in the array of the two or more pixels 3 and is connected to the vertical selection unit 4. The control signal line 83 transfers the selection control signal Vseli.

The transfer transistor 32 is controlled on the basis of the transfer control signal Vtxi output from the vertical selection unit 4. The transfer transistor 32 of the pixel 3 of the first row is controlled on the basis of the transfer control signal Vtx1, and the transfer transistor 32 of the pixel 3 of the second row is controlled on the basis of the transfer control signal Vtx2. The reset transistor 34 is controlled on the basis of the reset control signal Vrsi output from the vertical selection unit 4. The reset transistor 34 of the pixel 3 of the first row is controlled on the basis of the reset control signal Vrs1, and the reset transistor 34 of the pixel 3 of the second row is controlled on the basis of the reset control signal Vrs2. The selection transistor 36 is controlled on the basis of the selection control signal Vseli output from the vertical selection unit 4. The selection transistor 36 of the pixel 3 of the first row is controlled on the basis of the selection control signal Vsel1, and the selection transistor 36 of the pixel 3 of the second row is controlled on the basis of the selection control signal Vsel2.

The photoelectric conversion unit 31 generates an electric charge that is based on the amount of incident light. The transfer transistor 32 transfers the electric charge generated by the photoelectric conversion unit 31 to the charge storage portion 33. The charge storage portion 33 is a floating diffusion. The charge storage portion 33 stores the electric charge transferred by the transfer transistor 32. The reset transistor 34 resets the voltage of the charge storage portion 33 to a predetermined voltage. The amplification transistor 35 generates a pixel signal by amplifying a signal that is based on the voltage of the charge storage portion 33. The selection transistor 36 outputs the pixel signal to the vertical signal line 70. The vertical signal line 70 is disposed for each column in the array of the two or more pixels 3. The first pixel signal having the reset level and the second pixel signal having the signal level are output from the pixel 3.

The drain terminal of the transfer transistor 32 may be connected to the terminal T31b of the photoelectric conversion unit 31, and the source terminal of the transfer transistor 32 may be connected to the charge storage portion 33. The source terminal of the reset transistor 34 may be connected to the power source line 80, and the drain terminal of the reset transistor 34 may be connected to the charge storage portion 33. The source terminal of the amplification transistor 35 may be connected to the power source line 80, and the drain terminal of the amplification transistor 35 may be connected to the selection transistor 36. The source terminal of the selection transistor 36 may be connected to the drain terminal or the source terminal of the amplification transistor 35, and the drain terminal of the selection transistor 36 may be connected to the vertical signal line 70.

The above-described imaging device 1 includes the two or more pixels 3 disposed in a matrix shape. Each of the two or more pixels 3 includes at least the photoelectric conversion unit 31 (photo diode), the charge storage portion 33 (floating diffusion), the reset transistor 34, and the transfer transistor 32. The photoelectric conversion unit 31 generates an electric charge through photoelectric conversion. The charge storage portion 33 stores the electric charge generated by the photoelectric conversion unit 31. The power source voltage VDD is input to the drain terminal T34d (first terminal) of the reset transistor 34. The source terminal T34s (second terminal) of the reset transistor 34 is electrically connected to the charge storage portion 33. The source terminal T32s (third terminal) of the transfer transistor 32 is electrically connected to the photoelectric conversion unit 31. The drain terminal T32d (fourth terminal) of the transfer transistor 32 is electrically connected to the charge storage portion 33.

The power source voltage VDD and the ground voltage GND are direct-current (DC) voltages. The power source voltage VDD is a higher positive voltage than the ground voltage GND.

Figure 3:
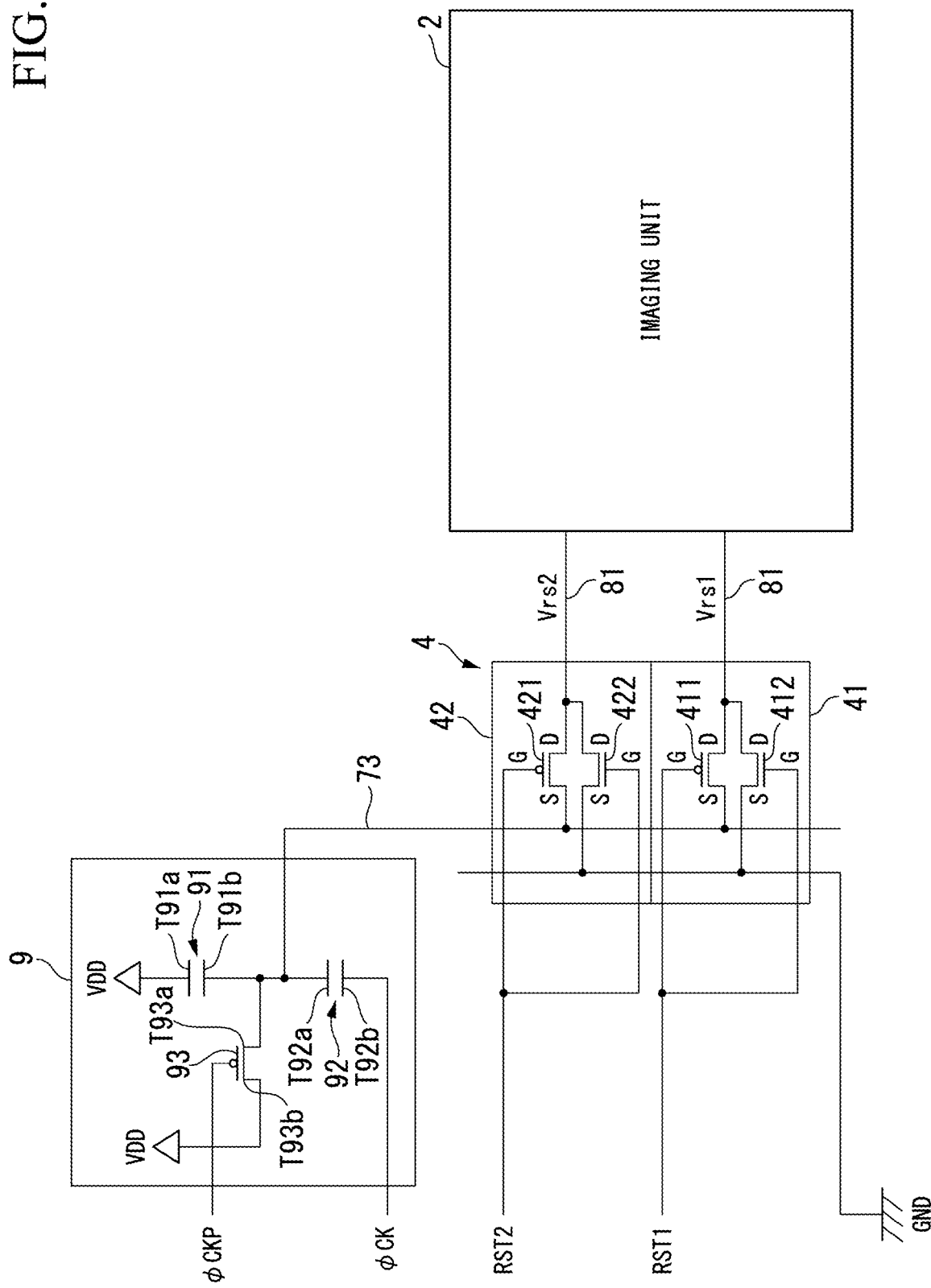
FIG. 3 is a circuit diagram showing a configuration of a vertical selection unit and a voltage generation circuit in the imaging device according to the first embodiment of the present invention.

FIG. 3 shows a configuration of the vertical selection unit 4 and the voltage generation circuit 9. The voltage generation circuit 9 is a booster circuit. In the vertical selection unit 4 shown in FIG. 3, a circuit that generates the reset control signal Vrs1 and the reset control signal Vrs2 is shown. In the vertical selection unit 4 shown in FIG. 3, a circuit that generates the transfer control signal Vtx1, the transfer control signal Vtx2, the selection control signal Vsel1, and the selection control signal Vsel2 is not shown.

The voltage generation circuit 9 shown in FIG. 3 includes a first capacitance element 91, a second capacitance element 92, and a switch 93. The first capacitance element 91 includes a terminal T91a (sixth terminal) and a terminal T91b (fifth terminal) and stores an electric charge in accordance with the difference between the voltage of the terminal T91a and the voltage of the terminal T91b. The second capacitance element 92 includes a terminal T92a (seventh terminal) and a terminal T92b (eighth terminal) and stores an electric charge in accordance with the difference between the voltage of the terminal T92a and the voltage of the terminal T92b.

The power source voltage VDD is input to the terminal T91a of the first capacitance element 91. The terminal T91b of the first capacitance element 91 is electrically connected to a signal line 73. The terminal T92a of the second capacitance element 92 is electrically connected to the terminal T91b of the first capacitance element 91. A signal φCK is input to the terminal T92b of the second capacitance element 92. The signal φCK has a low level or a high level. For example, the low level is the ground voltage GND, and the high level is the power source voltage VDD. Accordingly, the ground voltage GND or the power source voltage VDD is input to the terminal T92b of the second capacitance element 92.

The switch 93 includes a terminal T93a (ninth terminal) and a terminal T93b (tenth terminal). The terminal T93a of the switch 93 is electrically connected to the terminal T91b of the first capacitance element 91. The power source voltage VDD (first voltage) is input to the terminal T93b of the switch 93. The state of the switch 93 becomes either an ON state or an OFF state. When the state of the switch 93 is the ON state, the terminal T93a and the terminal T93b are electrically connected to each other. When the state of the switch 93 is the OFF state, the terminal T93a and the terminal T93b are electrically insulated from each other.

The state of the switch 93 is controlled on the basis of a control signal φCKP. The control signal φCKP has the low level or the high level. When the voltage of the control signal φCKP is the low level, the state of the switch 93 is the ON state. At this time, the power source voltage VDD is input to the terminal T91b of the first capacitance element 91 via the switch 93. When the voltage of the control signal φCKP is the high level, the state of the switch 93 is the OFF state. A circuit not shown in FIG. 3 generates the signal φCK and the control signal φCKP.

In the example shown in FIG. 3, the switch 93 is a PMOS transistor. The terminal T93a of the switch 93 is a drain terminal, and the terminal T93b of the switch 93 is a source terminal. The control signal φCKP is input to the gate terminal of the switch 93.

The voltage generation circuit 9 may include a transistor used for resetting the voltage of the terminal T91b of the first capacitance element 91 to the ground voltage GND. A different DC voltage from the power source voltage VDD may be input to the terminal T91a of the first capacitance element 91. For example, the ground voltage GND may be input to the terminal T91a of the first capacitance element 91.

A schematic operation of the voltage generation circuit 9 will be described. The voltage generation circuit 9 provides the terminal T91b of the first capacitance element 91 with the power source voltage VDD (first voltage) so as to store an electric charge in the first capacitance element 91. After the electric charge is stored in the first capacitance element 91 in accordance with the power source voltage VDD, the voltage generation circuit 9 increases the voltage of the terminal T91b of the first capacitance element 91 by a voltage (second voltage) in accordance with the power source voltage VDD. In this way, the voltage generation circuit 9 generates the control voltage having a greater absolute value than that of the power source voltage VDD.

Specifically, when the state of the switch 93 is the ON state, the power source voltage VDD (first voltage) is input to the terminal T91b of the first capacitance element 91. After the state of the switch 93 changes from the ON state to the OFF state, the voltage of the terminal T91b of the first capacitance element 91 increases by the voltage (second voltage) in accordance with the power source voltage VDD when the power source voltage VDD (third voltage) is input to the terminal T92b of the second capacitance element 92.

When the state of the switch 93 is the ON state, the voltage of the signal φCK is the low level. At this time, the ground voltage GND is input to the terminal T92b of the second capacitance element 92. After the state of the switch 93 changes to the OFF state, the voltage of the signal φCK changes to the high level. At this time, the power source voltage VDD is input to the terminal T92b of the second capacitance element 92. Since the electric charge stored in the first capacitance element 91 and the second capacitance element 92 is saved and the voltage of the terminal T92b of the second capacitance element 92 increases, the voltage of the terminal T92a of the second capacitance element 92 and the terminal T91b of the first capacitance element 91 increases.

A value Vh of the control voltage is expressed as the following Expression (1). In Expression (1), the capacitance value of the first capacitance element 91 is C1, and the capacitance value of the second capacitance element 92 is C2. In Expression (1), the value of the power source voltage VDD is Vdd.

$$Vh = \frac{C2}{C1+C2} \times Vdd + Vdd \qquad (1)$$

When the power source voltage VDD is input to the terminal T92b of the second capacitance element 92, the voltage of the terminal T91b of the first capacitance element 91 increases by a voltage "(C2/(C1+C2))×Vdd" shown in Expression (1). For example, when the capacitance value C1 is 2.8 [pF] and the capacitance value C2 is 0.5 [pF] and the voltage value Vdd is 3.3 [V], the value Vh of the control voltage is 3.8 [V].

As long as a higher control voltage than the power source voltage VDD is generated, a lower voltage than the power source voltage VDD may be input to the terminal T91b of the first capacitance element 91 via the switch 93 instead of the power source voltage VDD. As long as a higher control voltage than the power source voltage VDD is generated, a lower voltage than the power source voltage VDD may be input to the terminal T92b of the second capacitance element 92 instead of the power source voltage VDD. As long as a higher control voltage than the power source voltage VDD is generated, a higher voltage than the ground voltage GND may be input to the terminal T92b of the second capacitance element 92 instead of the ground voltage GND.

The vertical selection unit 4 (output circuit) outputs the control voltage generated by the voltage generation circuit 9 to the gate terminal T34g of the reset transistor 34. The vertical selection unit 4 sequentially selects rows in the array of the two or more pixels 3 and electrically connects the pixels 3 included in the selected row and the voltage generation circuit 9.

The vertical selection unit 4 shown in FIG. 3 includes a selection circuit 41 and a selection circuit 42. The selection circuit 41 selects a first row in the array of the two or more pixels 3 on the basis of a reset instruction signal RST1 and electrically connects the pixels 3 included in the first row and the voltage generation circuit 9. The selection circuit 42 selects a second row in the array of the two or more pixels 3 on the basis of a reset instruction signal RST2 and electrically connects the pixels 3 included in the second row and the voltage generation circuit 9. A circuit not shown in FIG. 3 generates the reset instruction signal RST1 and the reset instruction signal RST2.

The selection circuit 41 includes a transistor 411 and a transistor 412. In the example shown in FIG. 3, the transistor 411 is a PMOS transistor, and the transistor 412 is an NMOS transistor. Each of the transistor 411 and the transistor 412 includes a source terminal, a drain terminal, and a gate terminal. In FIG. 3, a character "S" indicating the source terminal is shown near the source terminal. In FIG. 3, a character "D" indicating the drain terminal is shown near the drain terminal. In FIG. 3, a character "G" indicating the gate terminal is shown near the gate terminal.

The source terminal of the transistor 411 is electrically connected to the signal line 73. Accordingly, the source terminal of the transistor 411 is connected to the terminal T91b of the first capacitance element 91 via the signal line 73. The power source voltage VDD or the control voltage output from the voltage generation circuit 9 is input to the source terminal of the transistor 411. The drain terminal of the transistor 411 is electrically connected to the control signal line 81. Accordingly, the drain terminal of the transistor 411 is connected to the gate terminal T34g of the reset transistor 34 in the pixel 3 via the control signal line 81. The reset instruction signal RST1 is input to the gate terminal of the transistor 411.

The transistor 411 functions as a switch. The state of the transistor 411 becomes either an ON state or an OFF state. When the state of the transistor 411 is the ON state, the source terminal of the transistor 411 and the drain terminal of the transistor 411 are electrically connected to each other. When the state of the transistor 411 is the OFF state, the source terminal of the transistor 411 and the drain terminal of the transistor 411 are electrically insulated from each other.

The state of the transistor 411 is controlled on the basis of the reset instruction signal RST1. The reset instruction signal RST1 has the low level or the high level. When the voltage of the reset instruction signal RST1 is the low level, the state of the transistor 411 is the ON state. At this time, the power source voltage VDD or the control voltage output from the voltage generation circuit 9 is output from the drain terminal of the transistor 411. The control voltage is output to the control signal line 81 as the reset control signal Vrs1. When the voltage of the reset instruction signal RST1 is the high level, the state of the transistor 411 is the OFF state.

The transistor 411 (selection transistor) is electrically connected to the voltage generation circuit 9 and the gate terminal T34g of the reset transistor 34 in each of the two or more pixels 3. In a reset period during which the reset instruction signal RST1 of the low level is provided to the transistor 411, the transistor 411 electrically connects the gate terminal T34g of the reset transistor 34 and the voltage generation circuit 9. The voltage generation circuit 9 generates the control voltage in the reset period.

The voltage generation circuit 9 generates the control voltage after generating a voltage (first voltage) in accordance with the power source voltage VDD. The selection circuit 41 outputs the voltage to the gate terminal T34g of the reset transistor 34 in accordance with the power source voltage VDD and then outputs the control voltage to the gate terminal T34g of the reset transistor 34.

The transistor 411 may be an enhancement-type transistor. When the difference between the control voltage and the power source voltage VDD is within a predetermined range, different pixels 3 from those to be selected are not accidently selected.

The source terminal of the transistor 412 is connected to the ground. The ground voltage GND is input to the source terminal of the transistor 412. The drain terminal of the transistor 412 is electrically connected to the control signal line 81. Accordingly, the drain terminal of the transistor 412 is connected to the gate terminal T34g of the reset transistor 34 in the pixel 3 via the control signal line 81. The reset instruction signal RST1 is input to the gate terminal of the transistor 412.

The transistor 412 functions as a switch. The state of the transistor 412 becomes either an ON state or an OFF state. When the state of the transistor 412 is the ON state, the source terminal of the transistor 412 and the drain terminal of the transistor 412 are electrically connected to each other. When the state of the transistor 412 is the OFF state, the source terminal of the transistor 412 and the drain terminal of the transistor 412 are electrically insulated from each other.

The state of the transistor 412 is controlled on the basis of the reset instruction signal RST1. When the voltage of the reset instruction signal RST1 is the high level, the state of the transistor 412 is the ON state. At this time, the ground voltage GND is output from the drain terminal of the transistor 412. Therefore, the reset control signal Vrs1 of the low level is output to the control signal line 81. When the voltage of the reset instruction signal RST1 is the low level, the state of the transistor 412 is the OFF state.

The selection circuit 42 includes a transistor 421 and a transistor 422. The transistor 421 is constituted similarly to the transistor 411, and the transistor 422 is constituted similarly to the transistor 412. The reset instruction signal RST2 is input to the gate terminal of each of the transistor 421 and the transistor 422. When the state of the transistor 421 is the ON state and the state of the transistor 422 is the OFF state, the power source voltage VDD or the control voltage output from the voltage generation circuit 9 is output to the control signal line 81 as the reset control signal Vrs2. When the state of the transistor 421 is the OFF state and the state of the transistor 422 is the ON state, the ground voltage GND is output to the control signal line 81 as the reset control signal Vrs2.

Figure 4:
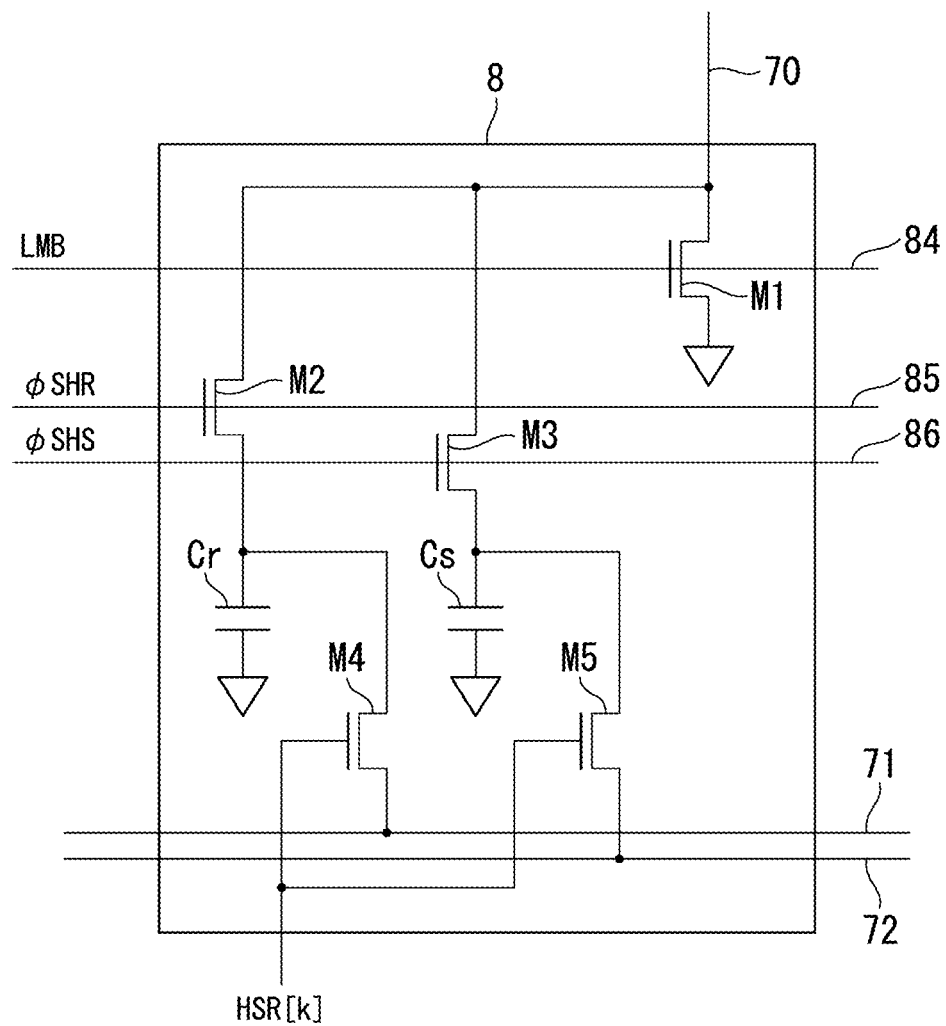
FIG. 4 is a circuit diagram showing a configuration of a column circuit in the imaging device according to the first embodiment of the present invention.

FIG. 4 shows a configuration of the column circuit 8. The column circuit 8 shown in FIG. 4 includes a transistor M1, a sample transistor M2, a sample transistor M3, a column selection transistor M4, a column selection transistor M5, a capacitance element Cr, and a capacitance element Cs. Each transistor shown in FIG. 4 is an NMOS transistor. Each transistor shown in FIG. 4 includes a source terminal, a drain terminal, and a gate terminal.

The drain terminal of the transistor M1 is connected to the vertical signal line 70. The source terminal of the transistor M1 is connected to the ground. The gate terminal of the transistor M1 is connected to a power source line 84. The power source line 84 is connected to a power source that outputs a predetermined voltage LMB.

The drain terminal of the sample transistor M2 is connected to the vertical signal line 70. The source terminal of the sample transistor M2 is connected to the capacitance element Cr. The gate terminal of the sample transistor M2 is connected to a control signal line 85. The control signal line 85 extends in the row direction in the array of the two or more pixels 3. The control signal line 85 transfers a sample-and-hold pulse ϕSHR.

The drain terminal of the sample transistor M3 is connected to the vertical signal line 70. The source terminal of the sample transistor M3 is connected to the capacitance element Cs. The gate terminal of the sample transistor M3 is connected to a control signal line 86. The control signal line 86 extends in the row direction in the array of the two or more pixels 3. The control signal line 86 transfers a sample-and-hold pulse ϕSHS.

Each of the capacitance element Cr and the capacitance element Cs includes a first terminal and a second terminal. The first terminal of the capacitance element Cr is connected to the source terminal of the sample transistor M2. The second terminal of the capacitance element Cr is connected to the ground. The first terminal of the capacitance element Cs is connected to the source terminal of the sample transistor M3. The second terminal of the capacitance element Cs is connected to the ground.

The drain terminal of the column selection transistor M4 is connected to the first terminal of the capacitance element Cr. The source terminal of the column selection transistor M4 is connected to the first horizontal signal line 71. The gate terminal of the column selection transistor M4 is connected to the horizontal selection unit 6.

The drain terminal of the column selection transistor M5 is connected to the first terminal of the capacitance element Cs. The source terminal of the column selection transistor M5 is connected to the second horizontal signal line 72. The gate terminal of the column selection transistor M5 is connected to the horizontal selection unit 6.

An operation of the sample transistor M2 is controlled on the basis of the sample-and-hold pulse ϕSHR. An operation of the sample transistor M3 is controlled on the basis of the sample-and-hold pulse ϕSHS. An operation of each of the column selection transistor M4 and the column selection transistor M5 is controlled on the basis of the selection pulse HSR[k] output from the horizontal selection unit 6. The number k is one or two.

The transistor M1 functions as a current source. The sample transistor M2 samples the first pixel signal of the reset level output from the pixel 3 to the vertical signal line 70. The sample transistor M3 samples the second pixel signal of the signal level output from the pixel 3 to the vertical signal line 70. The capacitance element Cr holds the first pixel signal of the reset level sampled by the sample transistor M2. The capacitance element Cs holds the second pixel signal of the signal level sampled by the sample transistor M3. The capacitance element Cr and the capacitance element Cs are sample capacitors.

The column selection transistor M4 outputs the first pixel signal held in the capacitance element Cr to the first horizontal signal line 71. The column selection transistor M5 outputs the second pixel signal held in the capacitance element Cs to the second horizontal signal line 72. The column selection transistor M4 and the column selection transistor M5 of the first column are controlled on the basis of the selection pulse HSR[1]. The column selection transistor M4 and the column selection transistor M5 of the second column are controlled on the basis of the selection pulse HSR[2].

Figure 5:
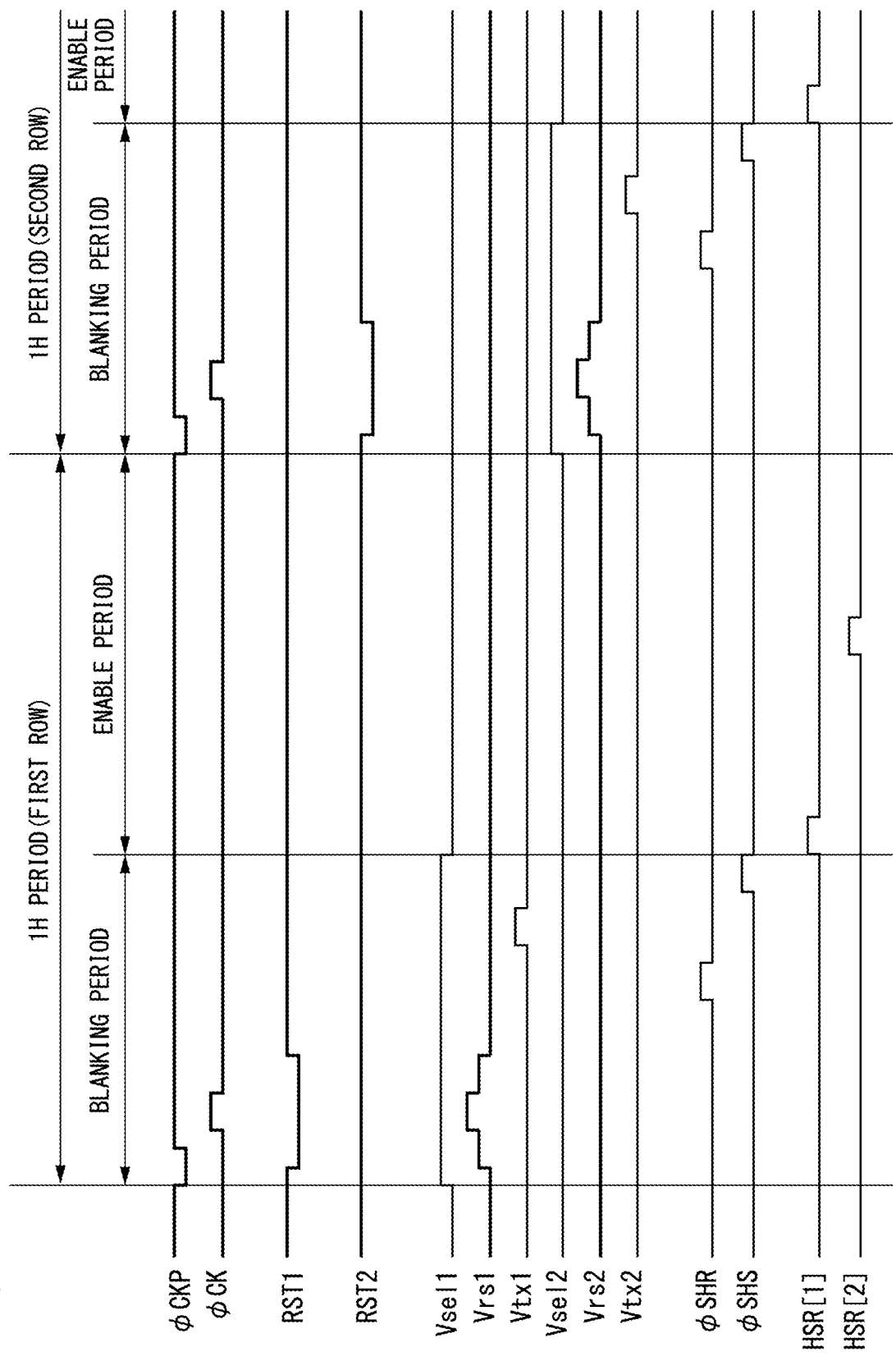
FIG. 5 is a timing chart showing an operation of the imaging device according to the first embodiment of the present invention.

An operation of the imaging device 1 will be described. FIG. 5 shows the operation of the imaging device 1. Hereinafter, a signal-reading operation executed by the imaging device 1 will be described. As a representative example, an operation in which the imaging device 1 reads the pixel signal from the pixel 3 of the first row in the array of the two or more pixels 3 will be described.

In FIG. 5, waveforms of the control signal ϕCKP, the signal ϕCK, the reset instruction signal RST1, the reset instruction signal RST2, the selection control signal Vsel1, the reset control signal Vrs1, the transfer control signal Vtx1, the selection control signal Vsel2, the reset control signal Vrs2, the transfer control signal Vtx2, the sample-and-hold pulse ϕSHR, the sample-and-hold pulse ϕSHS, the selection pulse HSR[1], and the selection pulse HSR[2] are shown. The horizontal direction in FIG. 5 indicates time and the vertical direction in FIG. 5 indicates a voltage.

A 1H period in which a pixel signal of one row is read includes a blanking period and an enable period. In the blanking period, the first pixel signal of the reset level and the second pixel signal of the signal level are read. The voltage of each of the signal ϕCK, the selection control signal Vsel1, the reset control signal Vrs1, the transfer control signal Vtx1, the selection control signal Vsel2, the reset control signal Vrs2, the transfer control signal Vtx2, the sample-and-hold pulse ϕSHR, the sample-and-hold pulse ϕSHS, the selection pulse HSR[1], and the selection pulse HSR[2] is the low level before the 1H period is started. The voltage of each of the control signal ϕCKP, the reset instruction signal RST1, and the reset instruction signal RST2 is the high level before the 1H period is started. This is only an example and the present invention is not limited to this.

(Generation of Control Voltage)

Before the blanking period is started, the voltage of the selection control signal Vsel1 is the low level. Therefore, the state of the selection transistors 36 in the pixels 3 of all the rows is the OFF state. When the blanking period is started, the voltage of the selection control signal Vsel1 changes from the low level to the high level. Therefore, the state of the selection transistors 36 in the pixels 3 of the first row becomes the ON state. In this way, the pixels 3 of the first row are selected.

Before the blanking period is started, the voltage of the control signal ϕCKP is the high level. Therefore, the state of the switch 93 of the voltage generation circuit 9 is the OFF state. When the blanking period is started, the voltage of the control signal ϕCKP changes from the high level to the low level. Therefore, the state of the switch 93 becomes the ON state. In this way, the power source voltage VDD is input to the terminal T91*b* of the first capacitance element 91 via the switch 93. The electric charge is stored in the first capacitance element 91 in accordance with the power source voltage VDD. The voltage generation circuit 9 outputs the power source voltage VDD to the signal line 73.

Before the blanking period is started, the voltage of the reset instruction signal RST1 and the voltage of the reset instruction signal RST2 are the high level. Therefore, the state of the transistor 411 and the transistor 421 in the vertical selection unit 4 is the OFF state, and the state of the transistor 412 and the transistor 422 in the vertical selection unit 4 is the ON state. The reset control signal Vrs1 and the reset control signal Vrs2 of the low level are output to the control signal line 81.

After the electric charge is stored in the first capacitance element 91, the voltage of the reset instruction signal RST1 changes from the high level to the low level. Therefore, the state of the transistor 411 becomes the ON state, and the state of the transistor 412 becomes the OFF state. In this way, the power source voltage VDD output from the voltage generation circuit 9 is output from the drain terminal of the transistor 411. The reset control signal Vrs1 having the power source voltage VDD is output to the control signal line 81.

The reset control signal Vrs1 having the power source voltage VDD is input to the gate terminal T34*g* of the reset transistor 34 in the pixel 3 of the first row via the control signal line 81. Therefore, the state of the reset transistor 34 becomes the ON state. In this way, the reset transistor 34 resets the voltage of the charge storage portion 33.

After the voltage of the reset instruction signal RST1 changes to the low level, the voltage of the control signal φCKP changes from the low level to the high level. Therefore, the state of the switch 93 becomes the OFF state. After the voltage of the control signal φCKP changes to the high level, the voltage of the signal φCK changes from the low level to the high level. Therefore, the power source voltage VDD is input to the terminal T92*b* of the second capacitance element 92. At this time, the voltage of the terminal T91*b* of the first capacitance element 91 increases in accordance with Expression (1). The voltage generation circuit 9 outputs the control voltage higher than the power source voltage VDD to the signal line 73.

The control voltage output from the voltage generation circuit 9 is output from the drain terminal of the transistor 411. The reset control signal Vrs1 having the control voltage is output to the control signal line 81.

The reset control signal Vrs1 having the control voltage is input to the gate terminal T34*g* of the reset transistor 34 in the pixel 3 of the first row via the control signal line 81. The reset transistor 34 resets the voltage of the charge storage portion 33 on the basis of the control voltage. Since the control voltage is higher than the power source voltage VDD, the voltage of the charge storage portion 33 is reliably reset to the power source voltage VDD. Therefore, the amount of the electric charge that can be stored in the charge storage portion 33 increases. In consequence, a reduction of an S/N ratio of the pixel signal is restricted.

Thereafter, the voltage of the signal φCK changes from the high level to the low level. Therefore, the ground voltage GND is input to the terminal T92*b* of the second capacitance element 92. At this time, the voltage of the terminal T91*b* of the first capacitance element 91 becomes the power source voltage VDD. The voltage generation circuit 9 outputs the power source voltage VDD to the signal line 73.

Since the state of the transistor 411 is the ON state, the power source voltage VDD output from the voltage generation circuit 9 is output from the drain terminal of the transistor 411. The reset control signal Vrs1 having the power source voltage VDD is output to the control signal line 81. The reset control signal Vrs1 having the power source voltage VDD is input to the gate terminal T34*g* of the reset transistor 34 in the pixel 3 of the first row via the control signal line 81.

After the voltage of the signal φCK changes to the low level, the voltage of the reset instruction signal RST1 changes from the low level to the high level. Therefore, the state of the transistor 411 becomes the OFF state, and the state of the transistor 412 becomes the ON state. In this way, the ground voltage GND is output from the drain terminal of the transistor 412. The reset control signal Vrs1 of the low level is output to the control signal line 81.

The reset control signal Vrs1 of the low level is input to the gate terminal T34*g* of the reset transistor 34 in the pixel 3 of the first row via the control signal line 81. Therefore, the state of the reset transistor 34 becomes the OFF state. In this way, the reset transistor 34 stops resetting of the charge storage portion 33.

(Reading of Reset Level)

While the charge storage portion 33 is reset, the first pixel signal of the reset level is output to the vertical signal line 70. After the resetting of the charge storage portion 33 is stopped, the voltage of the sample-and-hold pulse φSHR changes from the low level to the high level. In this way, the state of the sample transistor M2 becomes the ON state. Thereafter, the voltage of the sample-and-hold pulse φSHR changes from the high level to the low level. Therefore, the state of the sample transistor M2 becomes the OFF state. In this way, the first pixel signal of the reset level is held in the capacitance element Cr.

(Reading of Signal Level)

After the voltage of the sample-and-hold pulse φSHR changes to the low level, the voltage of the transfer control signal Vtx1 changes from the low level to the high level. Therefore, the state of the transfer transistor 32 becomes the ON state. In this way, the electric charge in the photoelectric conversion unit 31 is transferred to the charge storage portion 33, and the second pixel signal of the signal level is output to the vertical signal line 70. Thereafter, the voltage of the transfer control signal Vtx1 changes from the high level to the low level. Therefore, the state of the transfer transistor 32 becomes the OFF state. In this way, the transfer transistor 32 stops transfer of the electric charge.

After the voltage of the transfer control signal Vtx1 changes to the low level, the voltage of the sample-and-hold pulse φSHS changes from the low level to the high level. Therefore, the state of the sample transistor M3 becomes the ON state. Thereafter, the voltage of the sample-and-hold pulse φSHS changes from the high level to the low level. Therefore, the state of the sample transistor M3 becomes the OFF state. In this way, the second pixel signal of the signal level is held in the capacitance element Cs.

The voltage of the selection control signal Vsel1 changes from the high level to the low level concurrently with the voltage of the sample-and-hold pulse φSHS changing to the low level. Therefore, the state of the selection transistors 36 in the pixels 3 of the first row becomes the OFF state. In this way, selection of the pixels 3 of the first row is canceled, and the operation in which the pixel signals are read from the pixels 3 of the first row is completed. At this time, the blanking period is completed, and the enable period is started.

When the enable period is started, the voltage of the selection pulse HSR[1] changes from the low level to the high level. Therefore, the state of each of the column selection transistor M4 and the column selection transistor M5 in the column circuit 8 of the first column becomes the ON state. In this way, the first pixel signal of the reset level of the pixel 3 in the first row and the first column is output to the first horizontal signal line 71. At the same time, the second pixel signal of the signal level of the pixel 3 in the first row and the first column is output to the second horizontal signal line 72.

Thereafter, the voltage of the selection pulse HSR[1] changes from the high level to the low level. Therefore, the state of each of the column selection transistor M4 and the column selection transistor M5 becomes the OFF state. According to the above-described operation, the first pixel signal of the pixel 3 in the first row and the first column is read, and the second pixel signal of the pixel 3 in the first row and the first column is read.

After the voltage of the selection pulse HSR[1] changes to the low level, the voltage of the selection pulse HSR[2] changes from the low level to the high level. In this way, the first pixel signal of the pixel 3 in the first row and the second column is read, and the second pixel signal of the pixel 3 in the first row and the second column is read, as with the above-described operation. Thereafter, the voltage of the selection pulse HSR[2] changes from the high level to the low level.

Thereafter, the 1H period of the first row is completed, and the 1H period of the second row is started. In the 1H period of the second row, the imaging device 1 reads pixel signals from the pixels 3 of the second row. This operation is similar to that in the 1H period of the first row.

In the example shown in FIG. 5, the voltage of the reset instruction signal RST1 changes from the high level to the low level before the voltage of the signal φCK changes from the low level to the high level. The voltage of the reset instruction signal RST1 may change from the high level to the low level at any timing between a first timing and a second timing. The first timing is a timing at which the voltage of the control signal φCKP changes from the high level to the low level. The second timing is a timing at which the voltage of the signal φCK changes from the high level to the low level. This is only an example and the present invention is not limited to this.

In the example shown in FIG. 5, the voltage of the reset instruction signal RST1 changes from the low level to the high level after the voltage of the signal φCK changes from the high level to the low level. The voltage of the reset instruction signal RST1 may change from the low level to the high level at any timing between a third timing and a fourth timing. The third timing is a timing at which the voltage of the signal φCK changes from the low level to the high level. The fourth timing is a timing at which the voltage of the sample-and-hold pulse φSHR changes from the low level to the high level. This is only an example and the present invention is not limited to this.

An imaging device according to each aspect of the present invention has only to include a configuration corresponding to each of the imaging unit 2, the voltage generation circuit 9, and the vertical selection unit 4.

In the first embodiment, the imaging device 1 can generate the control voltage having a greater absolute value than that of the power source voltage VDD without using a large capacitance element. Since the reset transistor 34 resets the charge storage portion 33 on the basis of the control voltage, the amount of the electric charge that can be stored in the charge storage portion 33 increases and a reduction of an S/N ratio of the pixel signal is restricted.

The vertical selection unit 4 sequentially selects rows in the array of the two or more pixels 3 and electrically connects the pixels 3 included in the selected row and the voltage generation circuit 9. In this way, the imaging device 1 can use one voltage generation circuit 9 in common among the two or more rows. Therefore, an increase of the area of the imaging device 1 is restricted.

In the reset period, the transistor 411 and the transistor 421 electrically connect the gate terminal T34g of the reset transistor 34 and the voltage generation circuit 9. In this way, the control voltage is transferred from the voltage generation circuit 9 to the reset transistor 34. Therefore, the imaging device 1 can easily provide the reset transistor 34 with the control voltage.

The voltage generation circuit 9 switches the states of the switch 93 and switches the voltages of the terminal T92b of the second capacitance element 92, thus generating the control voltage. Therefore, the voltage generation circuit 9 can easily generate the control voltage. Since the voltage generation circuit 9 is configured as a simple circuit, the voltage generation circuit 9 is suitable for miniaturization of the imaging device 1.

When the state of the switch 93 is the ON state, the power source voltage VDD is input to the terminal T91b of the first capacitance element 91. In addition, after the state of the switch 93 changes from the ON state to the OFF state, the power source voltage VDD is input to the terminal T92b of the second capacitance element 92. Therefore, the imaging device 1 does not require a new voltage for generating the control voltage.

Second Embodiment

Figure 6:
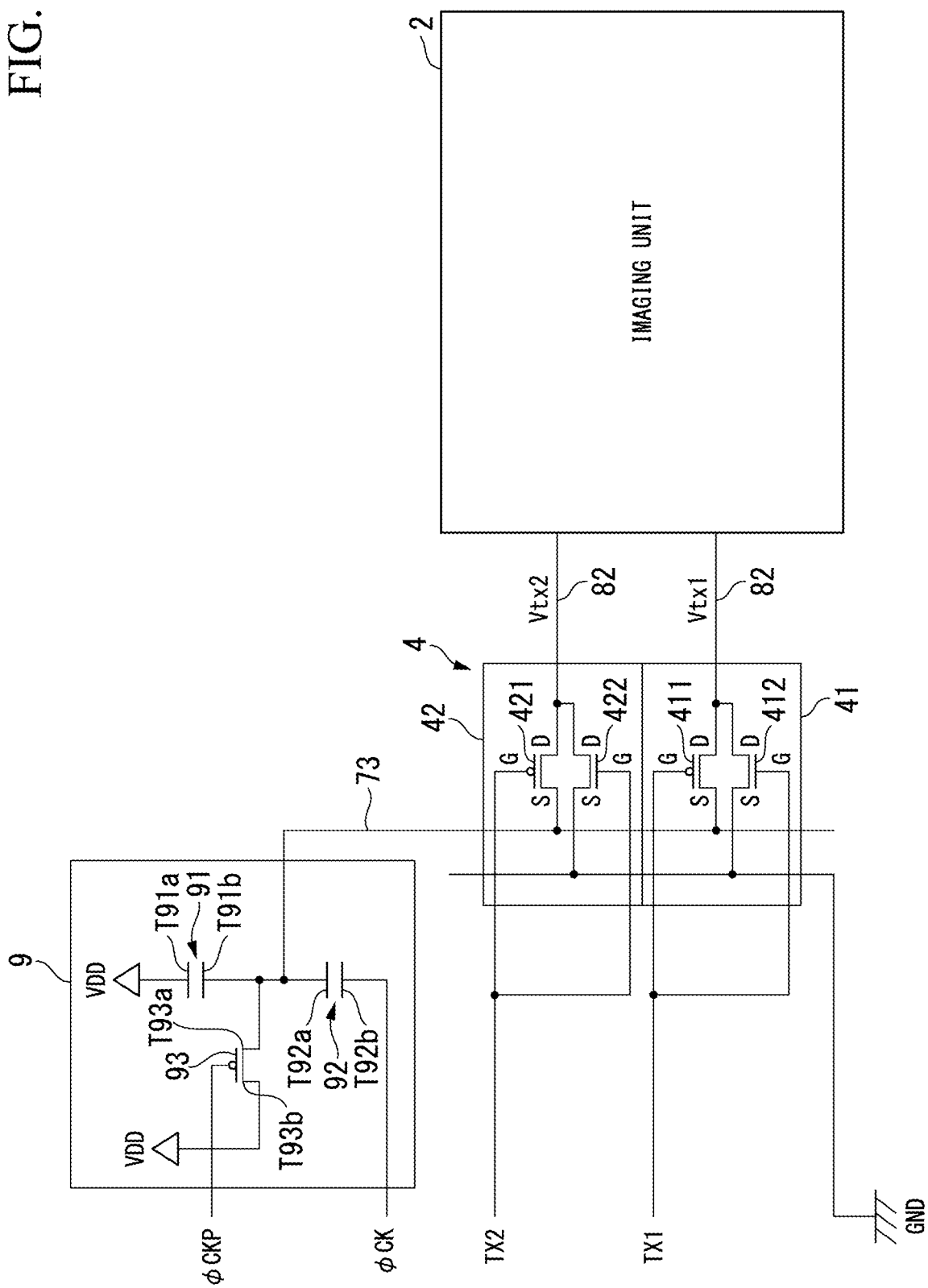
FIG. 6 is a circuit diagram showing a configuration of a vertical selection unit and a voltage generation circuit in an imaging device according to a second embodiment of the present invention.

FIG. 6 shows a configuration of the vertical selection unit 4 and the voltage generation circuit 9 in the imaging device 1 according to a second embodiment of the present invention. The voltage generation circuit 9 shown in FIG. 6 is the same as that shown in FIG. 3. In the vertical selection unit 4 shown in FIG. 6, a circuit that generates the transfer control signal Vtx1 and the transfer control signal Vtx2 is shown. In the vertical selection unit 4 shown in FIG. 6, a circuit that generates the reset control signal Vrs1, the reset control signal Vrs2, the selection control signal Vsel1, and the selection control signal Vsel2 is not shown.

The selection circuit 41 shown in FIG. 6 is similar to that shown in FIG. 3. The selection circuit 42 shown in FIG. 6 is similar to that shown in FIG. 3. Hereinafter, a different configuration from that shown in FIG. 3 will be described.

The drain terminal of the transistor 411 is electrically connected to the control signal line 82. Therefore, the drain terminal of the transistor 411 is electrically connected to the gate terminal T32g of the transfer transistor 32 in the pixel 3 via the control signal line 82. A transfer instruction signal TX1 is input to the gate terminal of the transistor 411.

The state of the transistor 411 is controlled on the basis of the transfer instruction signal TX1. The transfer instruction signal TX1 has the low level or the high level. When the voltage of the transfer instruction signal TX1 is the low level, the state of the transistor 411 is the ON state. At this time, the power source voltage VDD or the control voltage output from the voltage generation circuit 9 is output from the drain terminal of the transistor 411. The control voltage is output to the control signal line 82 as the transfer control signal Vtx1. When the voltage of the transfer instruction signal TX1 is the high level, the state of the transistor 411 is the OFF state.

The transistor 411 (selection transistor) is electrically connected to the voltage generation circuit 9 and the gate terminal T32g of the transfer transistor 32 in each of the two or more pixels 3. In a transfer period during which the transfer instruction signal TX1 of the low level is provided to the transistor 411, the transistor 411 electrically connects the gate terminal T32g of the transfer transistor 32 and the voltage generation circuit 9. The voltage generation circuit 9 generates the control voltage in the transfer period.

The voltage generation circuit 9 generates the control voltage after generating a voltage (first voltage) in accordance with the power source voltage VDD. The selection circuit 41 outputs the voltage to the gate terminal T32g of the transfer transistor 32 in accordance with the power source voltage VDD and then outputs the control voltage to the gate terminal T32g of the transfer transistor 32.

The drain terminal of the transistor 412 is electrically connected to the control signal line 82. Accordingly, the drain terminal of the transistor 412 is connected to the gate terminal T32g of the transfer transistor 32 in the pixel 3 via the control signal line 82. The transfer instruction signal TX1 is input to the gate terminal of the transistor 412.

The state of the transistor 412 is controlled on the basis of the transfer instruction signal TX1. When the voltage of the transfer instruction signal TX1 is the high level, the state of the transistor 412 is the ON state. At this time, the ground voltage GND is output from the drain terminal of the transistor 412. Therefore, the transfer control signal Vtx1 of the low level is output to the control signal line 82. When the voltage of the transfer instruction signal TX1 is the low level, the state of the transistor 412 is the OFF state.

A transfer instruction signal TX2 is input to the gate terminal of each of the transistor 421 and the transistor 422 in the selection circuit 42. When the state of the transistor 421 is the ON state and the state of the transistor 422 is the OFF state, the power source voltage VDD or the control voltage output from the voltage generation circuit 9 is output to the control signal line 82 as the transfer control signal Vtx2. When the state of the transistor 421 is the OFF state and the state of the transistor 422 is the ON state, the ground voltage GND is output to the control signal line 82 as the transfer control signal Vtx2.

Figure 7:
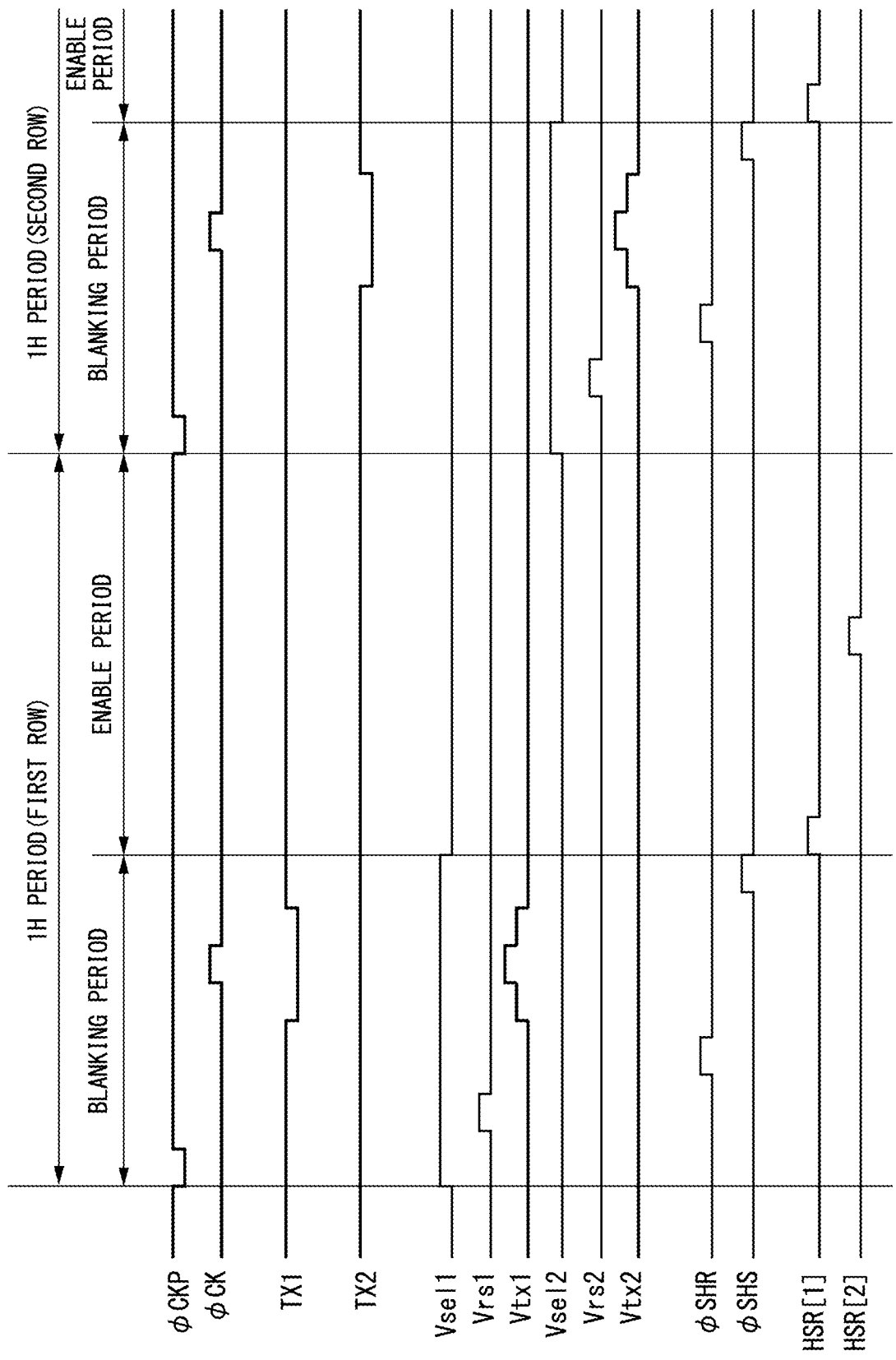
FIG. 7 is a timing chart showing an operation of the imaging device according to the second embodiment of the present invention.

An operation of the imaging device 1 will be described. FIG. 7 shows the operation of the imaging device 1. Hereinafter, a signal-reading operation executed by the imaging device 1 will be described. As a representative example, an operation in which the imaging device 1 reads the pixel signal from the pixel 3 of the first row in the array of the two or more pixels 3 will be described.

In FIG. 7, waveforms of the control signal φCKP, the signal φCK, the transfer instruction signal TX1, the transfer instruction signal TX2, the selection control signal Vsel1, the reset control signal Vrs1, the transfer control signal Vtx1, the selection control signal Vsel2, the reset control signal Vrs2, the transfer control signal Vtx2, the sample-and-hold pulse φSHR, the sample-and-hold pulse φSHS, the selection pulse HSR[1], and the selection pulse HSR[2] are shown. The horizontal direction in FIG. 7 indicates time and the vertical direction in FIG. 7 indicates a voltage.

A 1H period in which a pixel signal of one row is read includes a blanking period and an enable period. In the blanking period, the first pixel signal of the reset level and the second pixel signal of the signal level are read. The voltage of each of the signal φCK, the selection control signal Vsel1, the reset control signal Vrs1, the transfer control signal Vtx1, the selection control signal Vsel2, the reset control signal Vrs2, the transfer control signal Vtx2, the sample-and-hold pulse φSHR, the sample-and-hold pulse φSHS, the selection pulse HSR[1], and the selection pulse HSR[2] is the low level before the 1H period is started. The voltage of each of the control signal φCKP, the transfer instruction signal TX1, and the transfer instruction signal TX2 is the high level before the 1H period is started. This is only an example and the present invention is not limited to this.

Before the blanking period is started, the voltage of the selection control signal Vsel1 is the low level. Therefore, the state of the selection transistors 36 in the pixels 3 of all the rows is the OFF state. When the blanking period is started, the voltage of the selection control signal Vsel1 changes from the low level to the high level. Therefore, the state of the selection transistors 36 in the pixels 3 of the first row becomes the ON state. In this way, the pixels 3 of the first row are selected.

Before the blanking period is started, the voltage of the control signal φCKP is the high level. Therefore, the state of the switch 93 of the voltage generation circuit 9 is the OFF state. When the blanking period is started, the voltage of the control signal φCKP changes from the high level to the low level. Therefore, the state of the switch 93 becomes the ON state. In this way, the power source voltage VDD is input to the terminal T91b of the first capacitance element 91 via the switch 93. The electric charge is stored in the first capacitance element 91 in accordance with the power source voltage VDD. The voltage generation circuit 9 outputs the power source voltage VDD to the signal line 73.

Before the blanking period is started, the voltage of the transfer instruction signal TX1 and the voltage of the transfer instruction signal TX2 are the high level. Therefore, the state of the transistor 411 and the transistor 421 in the vertical selection unit 4 is the OFF state, and the state of the transistor 412 and the transistor 422 in the vertical selection unit 4 is the ON state. The transfer control signal Vtx1 and the transfer control signal Vtx2 of the low level are output to the control signal line 82.

Thereafter, the voltage of the control signal φCKP changes from the low level to the high level. Therefore, the state of the switch 93 becomes the OFF state.

After the voltage of the control signal φCKP changes to the high level, the voltage of the reset control signal Vrs1 changes from the low level to the high level. Therefore, the state of the reset transistor 34 becomes the ON state. In this way, the reset transistor 34 resets the voltage of the charge storage portion 33. Thereafter, the voltage of the reset control signal Vrs1 changes from the high level to the low level. Therefore, the state of the reset transistor 34 becomes the OFF state. In this way, the reset transistor 34 stops resetting of the charge storage portion 33.

(Reading of Reset Level)

While the charge storage portion 33 is reset, the first pixel signal of the reset level is output to the vertical signal line 70. After the resetting of the charge storage portion 33 is stopped, the voltage of the sample-and-hold pulse φSHR changes from the low level to the high level. In this way, the state of the sample transistor M2 becomes the ON state. Thereafter, the voltage of the sample-and-hold pulse φSHR changes from the high level to the low level. In this way, the state of the sample transistor M2 becomes the OFF state. Therefore, the first pixel signal of the reset level is held in the capacitance element Cr.

(Generation of Control Voltage)

After the voltage of the sample-and-hold pulse φSHR changes to the low level, the voltage of the transfer instruction signal TX1 changes from the high level to the low level.

Therefore, the state of the transistor 411 becomes the ON state, and the state of the transistor 412 becomes the OFF state. In this way, the power source voltage VDD output from the voltage generation circuit 9 is output from the drain terminal of the transistor 411. The transfer control signal Vtx1 having the power source voltage VDD is output to the control signal line 82.

The transfer control signal Vtx1 having the power source voltage VDD is input to the gate terminal T32g of the transfer transistor 32 in the pixel 3 of the first row via the control signal line 82. Therefore, the state of the transfer transistor 32 becomes the ON state. In this way, the electric charge in the photoelectric conversion unit 31 is transferred to the charge storage portion 33, and the second pixel signal of the signal level is output to the vertical signal line 70.

After the voltage of the transfer instruction signal TX1 changes to the low level, the voltage of the signal φCK changes from the low level to the high level. Therefore, the power source voltage VDD is input to the terminal T92b of the second capacitance element 92. At this time, the voltage of the terminal T91b of the first capacitance element 91 increases in accordance with Expression (1). The voltage generation circuit 9 outputs the control voltage higher than the power source voltage VDD to the signal line 73.

The control voltage output from the voltage generation circuit 9 is output from the drain terminal of the transistor 411. The transfer control signal Vtx1 having the control voltage is output to the control signal line 82.

The transfer control signal Vtx1 having the control voltage is input to the gate terminal T32g of the transfer transistor 32 in the pixel 3 of the first row via the control signal line 82. The transfer transistor 32 transfers the electric charge in the photoelectric conversion unit 31 to the charge storage portion 33 on the basis of the control voltage. Since the control voltage is higher than the power source voltage VDD, the electric charge in the photoelectric conversion unit 31 is reliably transferred to the charge storage portion 33. Therefore, the amount of the electric charge that can be stored in the charge storage portion 33 increases. In consequence, a reduction of an S/N ratio of the pixel signal is restricted.

Thereafter, the voltage of the signal φCK changes from the high level to the low level. Therefore, the ground voltage GND is input to the terminal T92b of the second capacitance element 92. At this time, the voltage of the terminal T91b of the first capacitance element 91 becomes the power source voltage VDD. The voltage generation circuit 9 outputs the power source voltage VDD to the signal line 73.

Since the state of the transistor 411 is the ON state, the power source voltage VDD output from the voltage generation circuit 9 is output from the drain terminal of the transistor 411. The transfer control signal Vtx1 having the power source voltage VDD is output to the control signal line 82. The transfer control signal Vtx1 having the power source voltage VDD is input to the gate terminal T32g of the transfer transistor 32 in the pixel 3 of the first row via the control signal line 82.

After the voltage of the signal φCK changes to the low level, the voltage of the transfer instruction signal TX1 changes from the low level to the high level. Therefore, the state of the transistor 411 becomes the OFF state, and the state of the transistor 412 becomes the ON state. In this way, the ground voltage GND is output from the drain terminal of the transistor 412. The transfer control signal Vtx1 of the low level is output to the control signal line 82.

The transfer control signal Vtx1 of the low level is input to the gate terminal T32g of the transfer transistor 32 in the pixel 3 of the first row via the control signal line 82. Therefore, the state of the transfer transistor 32 becomes the OFF state. In this way, the transfer transistor 32 stops transfer of the electric charge.

(Reading of Signal Level)

After the voltage of the transfer control signal Vtx1 changes to the low level, the voltage of the sample-and-hold pulse φSHS changes from the low level to the high level. Therefore, the state of the sample transistor M3 becomes the ON state. Thereafter, the voltage of the sample-and-hold pulse φSHS changes from the high level to the low level. Therefore, the state of the sample transistor M3 becomes the OFF state. In this way, the second pixel signal of the signal level is held in the capacitance element Cs.

The voltage of the selection control signal Vsel1 changes from the high level to the low level concurrently with the voltage of the sample-and-hold pulse φSHS changing to the low level. Therefore, the state of the selection transistors 36 in the pixels 3 of the first row becomes the OFF state. In this way, selection of the pixels 3 of the first row is canceled, and the operation in which the pixel signals are read from the pixels 3 of the first row is completed. At this time, the blanking period is completed, and the enable period is started. The operation in the enable period is similar to that shown in FIG. 5.

Thereafter, the 1H period of the first row is completed, and the 1H period of the second row is started. In the 1H period of the second row, the imaging device 1 reads pixel signals from the pixels 3 of the second row. This operation is similar to that in the 1H period of the first row.

In the example shown in FIG. 7, the voltage of the transfer instruction signal TX1 changes from the high level to the low level before the voltage of the signal φCK changes from the low level to the high level. The voltage of the transfer instruction signal TX1 may change from the high level to the low level at any timing between a first timing and a second timing. The first timing is a timing at which the voltage of the control signal φCKP changes from the high level to the low level. The second timing is a timing at which the voltage of the signal φCK changes from the high level to the low level. This is only an example and the present invention is not limited to this.

In the example shown in FIG. 7, the voltage of the transfer instruction signal TX1 changes from the low level to the high level after the voltage of the signal φCK changes from the high level to the low level. The voltage of the transfer instruction signal TX1 may change from the low level to the high level at any timing between a third timing and a fourth timing. The third timing is a timing at which the voltage of the signal φCK changes from the low level to the high level. The fourth timing is a timing at which the voltage of the sample-and-hold pulse φSHS changes from the low level to the high level. This is only an example and the present invention is not limited to this.

In the second embodiment, the imaging device 1 can generate the control voltage having a greater absolute value than that of the power source voltage VDD without using a large capacitance element. Since the transfer transistor 32 transfers the electric charge in the photoelectric conversion unit 31 to the charge storage portion 33 on the basis of the control voltage, the amount of the electric charge that can be stored in the charge storage portion 33 increases and a reduction of an S/N ratio of the pixel signal is restricted.

In the transfer period, the transistor 411 and the transistor 421 electrically connect the gate terminal T32g of the transfer transistor 32 and the voltage generation circuit 9. In this way, the control voltage is transferred from the voltage generation circuit 9 to the transfer transistor 32. Therefore, the imaging device 1 can easily provide the transfer transistor 32 with the control voltage.

Third Embodiment

Figure 8:
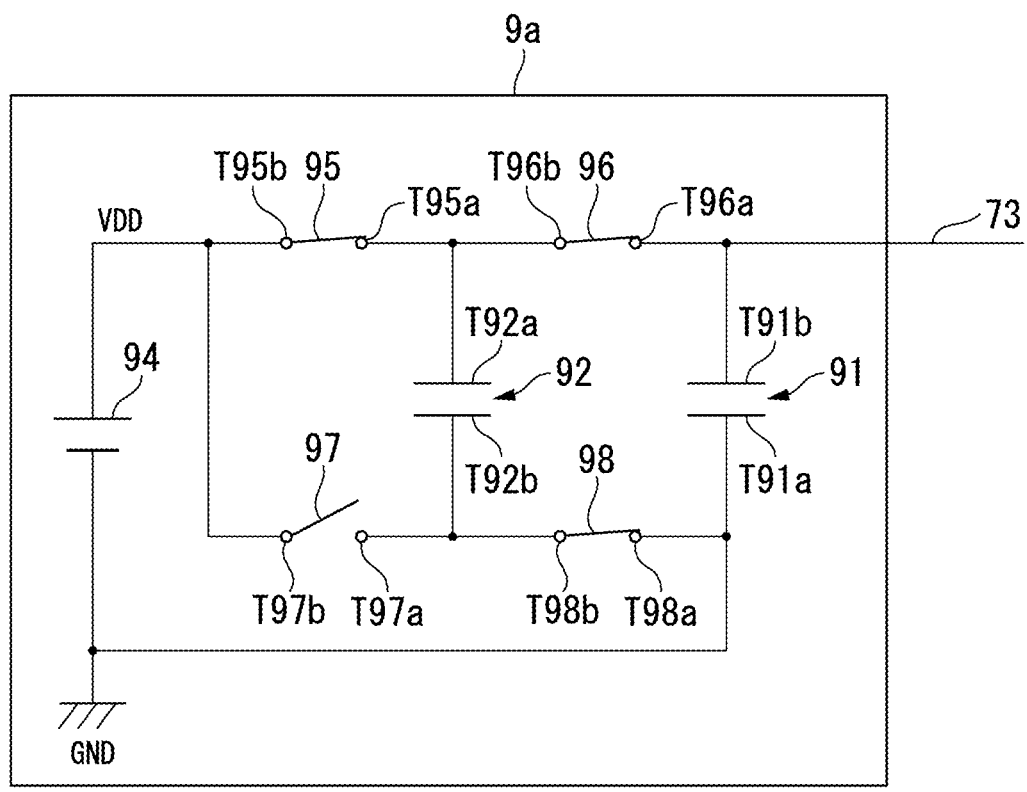
FIG. 8 is a circuit diagram showing a configuration of a voltage generation circuit in an imaging device according to a third embodiment of the present invention.

FIG. 8 shows a configuration of a voltage generation circuit 9a in the imaging device 1 according to a third embodiment of the present invention. The voltage generation circuit 9 shown in FIG. 3 or FIG. 6 is changed to the voltage generation circuit 9a shown in FIG. 8. The voltage generation circuit 9a includes a switched capacitor circuit. The voltage generation circuit 9a shown in FIG. 8 includes a first capacitance element 91, a second capacitance element 92, a power source 94, a switch 95, a switch 96, a switch 97, and a switch 98.

The power source 94 generates a power source voltage VDD. The first capacitance element 91 includes a terminal T91a (sixth terminal) and a terminal T91b (fifth terminal) and stores an electric charge in accordance with the difference between the voltage of the terminal T91a and the voltage of the terminal T91b. The second capacitance element 92 includes a terminal T92a (seventh terminal) and a terminal T92b (eighth terminal) and stores an electric charge in accordance with the difference between the voltage of the terminal T92a and the voltage of the terminal T92b.

The ground voltage GND is input to the terminal T91a of the first capacitance element 91. The terminal T91b of the first capacitance element 91 is electrically connected to a signal line 73.

The switch 95 includes a terminal T95a (ninth terminal) and a terminal T95b (tenth terminal). The switch 96 includes a terminal T96a and a terminal T96b. The switch 97 includes a terminal T97a and a terminal T97b. The switch 98 includes a terminal T98a and a terminal T98b. The state of each switch becomes either an ON state or an OFF state. When the state of each switch is the ON state, the two terminals of each switch are electrically connected to each other. When the state of each switch is the OFF state, the two terminals of each switch are electrically insulated from each other.

The terminal T96a of the switch 96 is electrically connected to the terminal T91b of the first capacitance element 91. Since the state of the switch 96 is always the ON state, the voltage generation circuit 9a does not need to include the switch 96. The ground voltage GND is input to the terminal T98a of the switch 98.

The terminal T95a of the switch 95 is electrically connected to the terminal T96b of the switch 96. Since the state of the switch 96 is always the ON state, the terminal T95a of the switch 95 is electrically connected to the terminal T91b of the first capacitance element 91. The power source voltage VDD (first voltage) is input to the terminal T95b of the switch 95.

The terminal T97a of the switch 97 is electrically connected to the terminal T98b of the switch 98. The power source voltage VDD is input to the terminal T97b of the switch 97.

The terminal T92a of the second capacitance element 92 is electrically connected to the terminal T96b of the switch 96. Since the state of the switch 96 is always the ON state, the terminal T92a of the second capacitance element 92 is electrically connected to the terminal T91b of the first capacitance element 91. In addition, the terminal T92a of the second capacitance element 92 is electrically connected to the terminal T95a of the switch 95.

The terminal T92b of the second capacitance element 92 is electrically connected to the terminal T97a of the switch 97 and the terminal T98b of the switch 98. When the state of the switch 97 is the OFF state and the state of the switch 98 is the ON state, the ground voltage GND is input to the terminal T92b of the second capacitance element 92. When the state of the switch 97 is the ON state and the state of the switch 98 is the OFF state, the power source voltage VDD is input to the terminal T92b of the second capacitance element 92.

A schematic operation of the voltage generation circuit 9a will be described. The voltage generation circuit 9a provides the terminal T91b of the first capacitance element 91 with the power source voltage VDD (first voltage) so as to store an electric charge in the first capacitance element 91. After the electric charge is stored in the first capacitance element 91 in accordance with the power source voltage VDD, the voltage generation circuit 9a increases the voltage of the terminal T91b of the first capacitance element 91 by a voltage (second voltage) in accordance with the power source voltage VDD. In this way, the voltage generation circuit 9a generates a control voltage having a greater absolute value than that of the power source voltage VDD.

Specifically, when the state of each of the switch 95, the switch 96, and the switch 98 is the ON state and the state of the switch 97 is the OFF state, the power source voltage VDD (first voltage) is input to the terminal T91b of the first capacitance element 91 and the terminal T92a of the second capacitance element 92. In addition, the ground voltage GND is input to the terminal T92b of the second capacitance element 92. Thereafter, the state of each of the switch 95 and the switch 98 changes from the ON state to the OFF state. In addition, the state of the switch 97 changes from the OFF state to the ON state. At this time, the power source voltage VDD is input to the terminal T92b of the second capacitance element 92. Since the electric charge stored in the first capacitance element 91 and the second capacitance element 92 is saved and the voltage of the terminal T92b of the second capacitance element 92 increases, the voltage of the terminal T92a of the second capacitance element 92 and the terminal T91b of the first capacitance element 91 increases by the voltage (second voltage) in accordance with the power source voltage VDD.

In the third embodiment, the imaging device 1 can generate the control voltage having a greater absolute value than that of the power source voltage VDD without using a large capacitance element. In a case in which the voltage generation circuit 9 shown in FIG. 3 is changed to the voltage generation circuit 9a shown in FIG. 8, the reset transistor 34 resets the charge storage portion 33 on the basis of the control voltage. In a case in which the voltage generation circuit 9 shown in FIG. 6 is changed to the voltage generation circuit 9a shown in FIG. 8, the transfer transistor 32 transfers the electric charge in the photoelectric conversion unit 31 to the charge storage portion 33 on the basis of the control voltage. Accordingly, the amount of the electric charge that can be stored in the charge storage portion 33 increases and a reduction of an S/N ratio of the pixel signal is restricted.

Fourth Embodiment

Figure 9:
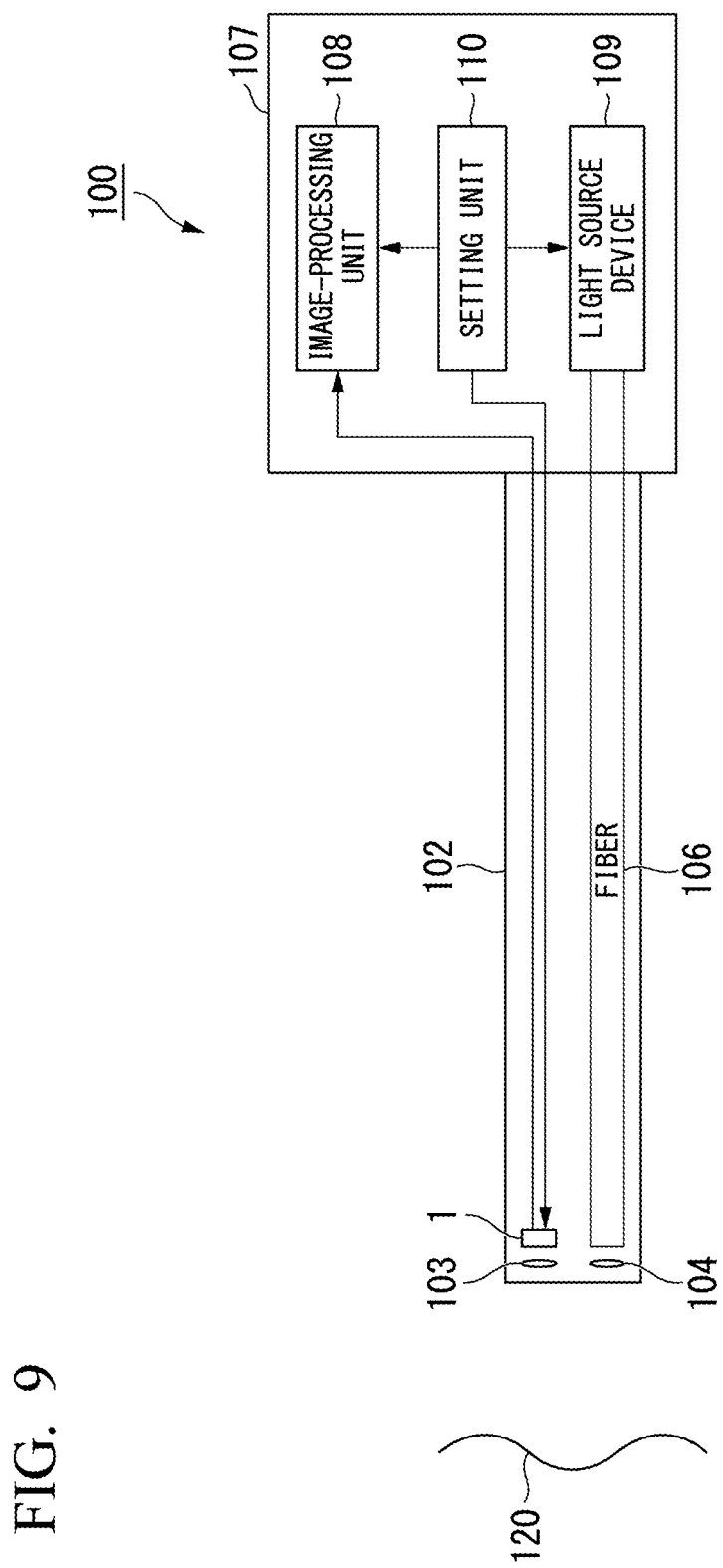
FIG. 9 is a block diagram showing a configuration of an endoscope system according to a fourth embodiment of the present invention.

FIG. 9 shows a configuration of an endoscope system 100 according to a fourth embodiment of the present invention. The endoscope system 100 includes the imaging device 1 according to any one of the first to third embodiments. The endoscope system 100 shown in FIG. 9 includes a scope 102 and a housing 107. The scope 102 includes the imaging device 1, a lens 103, a lens 104, and a fiber 106. The imaging device 1, the lens 103, and the lens 104 are disposed at the distal end part of the scope 102. The housing 107 includes an image-processing unit 108, a light source device 109, and a setting unit 110.

The lens 103 forms an image of reflected light from a subject 120 on the imaging device 1. The fiber 106 transfers illumination light with which the subject 120 is irradiated. The lens 104 irradiates the subject 120 with the illumination light transferred by the fiber 106. The light source device 109 includes a light source that generates the illumination light with which the subject 120 is irradiated. The image-processing unit 108 generates a captured image by performing predetermined processing on a signal output from the imaging device 1. The setting unit 110 controls an imaging mode of the endoscope system 100.

The configuration of the endoscope system 100 is not limited to the above-described configuration. An endoscope system according to each aspect of the present invention does not need to include a configuration corresponding to at least one of the lens 103, the lens 104, the fiber 106, the image-processing unit 108, the light source device 109, and the setting unit 110.

The endoscope system 100 according to the fourth embodiment includes the imaging device 1 that can generate the control voltage having a greater absolute value than that of the power source voltage VDD without using a large capacitance element. Therefore, the endoscope system 100 can generate the control voltage having a greater absolute value than that of the power source voltage VDD without using a large capacitance element.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device, comprising:
    two or more pixels disposed in a matrix shape, each of the pixels including:
        a photodiode configured to generate an electric charge through photoelectric conversion;
        a floating diffusion configured to store the electric charge generated by the photodiode;
        a reset transistor including:
            a first terminal to which a power source voltage is input;
            a second terminal electrically connected to the floating diffusion; and
            a gate terminal,
            wherein one of the first terminal and the second terminal is a source terminal, and
            wherein the other of the first terminal and the second terminal is a drain terminal; and
        a transfer transistor including:
            a third terminal electrically connected to the photodiode; and
            a fourth terminal electrically connected to the floating diffusion; and
            a gate terminal,
            wherein one of the third terminal and the fourth terminal is a source terminal, and
            wherein the other of the third terminal and the fourth terminal is a drain terminal;
    a voltage generation circuit configured to generate a control voltage having a greater absolute value than an absolute value of the power source voltage; and
    an output circuit configured to output a control voltage to at least one of the gate terminal of the reset transistor and the gate terminal of the transfer transistor,
    wherein the voltage generation circuit includes:
        a first capacitance element including a fifth terminal and a sixth terminal, wherein a direct-current voltage is inputted to the sixth terminal;
        a second capacitance element including:
            a seventh terminal electrically connected to the fifth terminal; and
            an eighth terminal; and
        a switch including:
            a ninth terminal electrically connected to the fifth terminal and the seventh terminal; and
            a tenth terminal to which a first voltage that is the same as or lower than the power source voltage is input,
            wherein a state of the switch is either an ON state in which the ninth terminal and the tenth terminal are electrically connected to each other or an OFF state in which the ninth terminal and the tenth terminal are electrically insulated from each other,
        wherein the voltage generation circuit is configured to, when the state of the switch is the ON state, input the first voltage to the fifth terminal and the seventh terminal and input a ground voltage to the eighth terminal so as to store an electric charge in the first capacitance element and the second capacitance element, and
        wherein the voltage generation circuit is configured to, after the state of the switch changes from the ON state to the OFF state, increase the first voltage of the fifth terminal and the seventh terminal by a second voltage that is the same as or lower than the power source voltage when a third voltage that is the same as or lower than the power source voltage and is higher than the ground voltage is input to the eighth terminal so as to generate the control voltage.

2. The imaging device according to claim 1,
    wherein an array of the two or more pixels includes two or more rows, and
    wherein the output circuit is configured to sequentially select the rows and electrically connect the voltage generation circuit and the pixel included in a selected row.

3. The imaging device according to claim 2,
    wherein the output circuit includes a selection transistor electrically connected to the voltage generation circuit and the gate terminal of the reset transistor in each of the two or more pixels,
    wherein the selection transistor is configured to electrically connect the gate terminal of the reset transistor and the voltage generation circuit to each other in a reset period in which a reset instruction signal is provided to the selection transistor, and
    wherein the voltage generation circuit is configured to generate the control voltage in the reset period.

4. The imaging device according to claim 2,
    wherein the output circuit includes a selection transistor electrically connected to the voltage generation circuit and the gate terminal of the transfer transistor in each of the two or more pixels,
    wherein the selection transistor is configured to electrically connect the gate terminal of the transfer transistor and the voltage generation circuit to each other in a transfer period in which a transfer instruction signal is provided to the selection transistor, and wherein the voltage generation circuit is configured to generate the control voltage in the transfer period.

5. The imaging device according to claim 1, comprising:

a first signal line that is electrically connected to the fifth terminal and the seventh terminal and is electrically connected to the output circuit; and a second signal line that is electrically connected to the output circuit and the gate terminal of the reset transistor, wherein the voltage generation circuit is configured to output the control voltage to the first signal line after outputting the first voltage to the first signal line, and wherein the output circuit is configured to output the control voltage that is inputted from the voltage generation circuit via the first signal line to the second signal line after outputting the first voltage that is inputted from the voltage generation circuit via the first signal line to the second signal line.

6. The imaging device according to claim 5, wherein the first voltage is the power source voltage.

7. The imaging device according to claim 1, comprising:

a first signal line that is electrically connected to the fifth terminal and the seventh terminal and is electrically connected to the output circuit; and a second signal line that is electrically connected to the output circuit and the gate terminal of the transfer transistor, wherein the voltage generation circuit is configured to output the control voltage to the first signal line after outputting the first voltage to the first signal line, and wherein the output circuit is configured to output the control voltage that is inputted from the voltage generation circuit via the first signal line to after outputting the first voltage that is inputted from the voltage generation circuit via the first signal line to the second signal line.

8. The imaging device according to claim 7, wherein the first voltage is the power source voltage.

9. An endoscope system, comprising the imaging device according to claim 1.

* * * * *